Dec. 2, 1958   M. V. PARSHALL   2,862,362
FLUID COUPLING CONSTRUCTION
Filed May 26, 1955
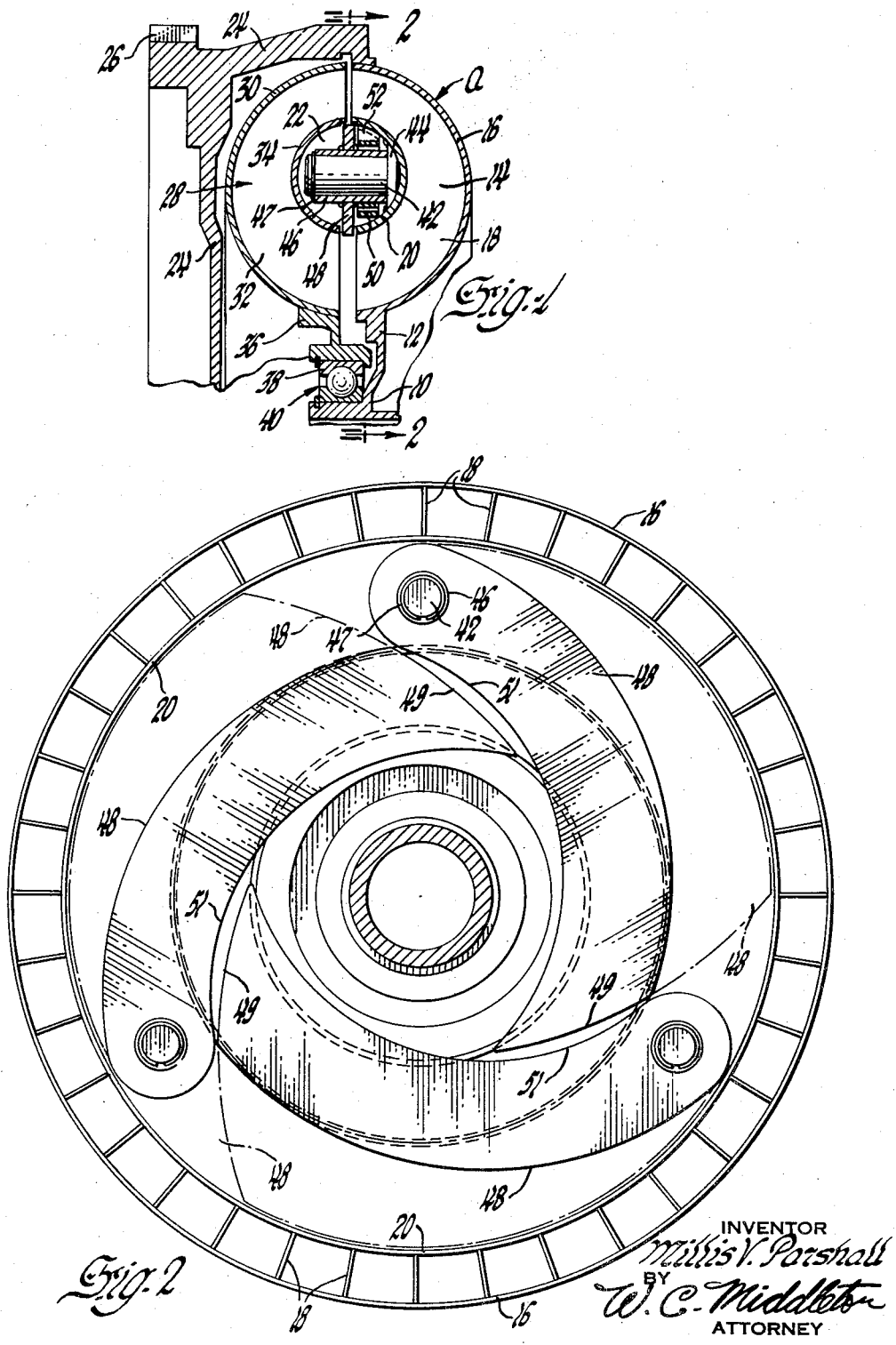
INVENTOR
Millis V. Parshall
BY
W. C. Middleton
ATTORNEY United States Patent Office 2,862,362
Patented Dec. 2, 1958

2,862,362

FLUID COUPLING CONSTRUCTION

Millis V. Parshall, Pontiac, Mich., assignor to General Motors Corporation, Detroit, Mich., a corporation of Delaware Application May 26, 1955, Serial No. 511,276

7 Claims. (Cl. 60—54)

This invention relates to a hydrodynamic drive device having means to automatically interrupt or impede the transmission of torque between a pump or impeller member and a turbine member at low speeds of the impeller to prevent undue rotation of the turbine which is connected to drive the output shaft of the drive device.

In a motor vehicle having a transmission employing the use of a hydraulic coupling or torque converter, it has been observed at times, that at normal engine idling speeds, when the vehicle is stationary, the pump member is discharging fluid into the turbine member at such a rate that the load on the output shaft is insufficient to prevent the turbine member from rotating. The rotation of the turbine will be transmitted to the output shaft and the vehicle will "creep" or move slightly at a low rate of speed. This so-called "creep" is undesirable, particularly when it is desired to maintain the vehicle stationary with the engine idling without having to apply the vehicle brakes.

Therefore it is an object of this invention to provide a hydro-dynamic drive device with means automatically operating at low pump speeds to impede or practically stop the free circulation of the fluid by the pump to the turbine, thereby preventing the tendency of the output shaft to "creep."

It is a further object of this invention to permit normal free fluid circulation between the pump and turbine members of the hydraulic device at increased pump speeds by automatically withdrawing the fluid interrupting means from the fluid circuit.

A further object of this invention is to provide a fluid coupling with fluid circuit impeding means rotatably mounted within the chamber defined by the inner shroud members of the coupling, thereby eliminating a need to provide an additional shell attached to the casing for containing said impeding means.

It is a further object to provide automatically operating fluid circuit impeding means mounted on the impeller member for swinging movement into and out of fluid circuit, thereby providing ease of manufacture, accessibility and compactness of the coupling unit.

Other features, advantages and objects will become apparent by reference to the detailed description of the invention and to the drawings wherein:

Figure 1 is a cross sectional view of a fluid coupling unit containing an embodiment of the present invention with the circuit impeding members withdrawn from impeding positions, and Figure 2 is an enlarged sectional view taken along lines 2—2 of Figure 1 showing the fluid impeding means in extended position (solid lines) interrupting the fluid circuit, and in retracted position within the chamber formed by the inner shroud members (dotted lines).

Referring to the drawings and more particularly to Figure 1, a fluid coupling unit *a* is shown therein having a sleeve member 10 with an extension 12 forming the hub of the pump member 14 of the fluid coupling unit. Connected to said hub member for rotation therewith is an outer shroud 16 of semi-circular shape having a plurality of dish-shaped pump blades 18 fastened thereto by any suitable means and being equally spaced around the periphery of said shroud member. Connected to said pump blades is an inner shroud ring or member 20 defining one-half of a chamber 22 containing the fluid circuit interrupting or impeding means. Attached to said outer shroud member at its outermost peripheral point is a rotatable shell member 24 for drivingly connecting said pump member to a source of power, such as an engine or the like. A conventional starting gear 26 is shown formed as an extension of said shell 24. Facing said pump member for cooperation therewith is a fluid turbine member 28 having an outer shroud portion 30 supporting a plurality of dish-shaped turbine blades 32, which are equally spaced around the periphery of said outer shroud member. Connecting said blades at their inner periphery is an inner shroud ring 34 forming the other half of chamber 22. Turbine member 28 has a hub portion 36 fastened to said outer shroud 30 and suitably supported for rotation on the outer race 38 of a bearing member 40 having its inner race connected for rotation with sleeve member 10. Hub member 36 may be connected to any suitable means, such as a sleeve shaft (not shown) or the like, to drive the same. The coupling unit is normally adapted to be filled at all times with fluid from any suitable source. Shell member 24, in cooperation with pump shroud member 16 and extension 12 forms a seal to prevent the escape of fluid within the coupling unit.

As pump member 14 is caused to rotate by shell 24, fluid is picked up by the blades of the pump member and discharged into the turbine member causing the same to rotate, thereby driving the output shaft. The blades are so shaped that fluid will circulate in a substantially circular pattern from the pump member to the turbine member and back to the pump member. Accordingly, the turbine member will increase in speed from zero to substantially a speed equal with that of the pump depending upon the slip due to friction losses and inefficiencies of the coupling.

At normal engine idling speeds, it frequently happens that the pump member will be rotating at such a speed that fluid will circulate from the pump to the turbine member and return at a rate such that the turbine member will rotate, thereby rotating the driven shaft with a resultant "creep" of the motor vehicle. This is undesirable, particularly when the vehicle driver wishes to have the vehicle remain stationary without having to apply the vehicle brakes.

To overcome this objection, means are provided for interrupting the transmission of torque from the input to the output shafts by interrupting or impeding the circulation of fluid at low speeds of the impeller or pump member to thereby prevent movement of the turbine member and the vehicle output shaft. This torque interrupting means consists of gate members or "spoilers" rotatably mounted on said impeller member within the chamber 22 defined by the inner shroud members 20 and 34 for swinging movement into and out of the fluid circuit. This means consists of a number of spindles or stub shafts 42 attached at 44 to the inner shroud 20 of pump member 14 and each rotatably supporting a bearing sleeve 46 upon which is mounted a plurality of gate members 48. The bearing sleeve 46 is held on spindle 42 by means of a snap ring 47. Surrounding said bearing member 46 is a coil spring 50 having one end 52 thereof attached to the impeller inner shroud 20 and with the other end thereof attached to the bearing sleeve 46. This coil spring yieldably biases the gate member, which is attached to said bearing sleeve as by welding or the like, into the fluid circuit between the exit and entrance portions of the turbine and pump blades, respectively. Spindles 42 extend from the pump inner shroud 20 to a position closely adjacent the turbine inner shroud ring 34 bridging the gap between the exit and entrance portions of the turbine and pump members, respectively.

In Figure 2, gate members 48 are shown in fluid impeding position in the fluid circuit. While the discharge ends of blades 18 have been shown between shrouds 16 and 20, the entrance ends of these blades between the shrouds have not been shown for purposes of drawing clarity. These gate members are adapted to be withdrawn from said circuit into the space defined by the inner shroud rings by centrifugal force acting on said members at speeds of the pump member above engine idling. Gate members 48 are shown in their retracted position within said chamber in dotted lines in Figure 2.

By mounting the fluid interrupting means within the space provided by the inner shroud members, the applicant has made available for use on most hydrodynamic drive devices a torque interrupting means that may be attached without altering the basic construction of said devices. This construction eliminates the necessity of providing an additional shell attached to the outside of the casing to house the gate members in retracted position.

It will be noted in Figure 2, that the gate members are substantially crescent-shaped so that the curved end portion 49 lies closely adjacent a curved side portion 51 of the next gate when the gates are biased into fluid impeding position. This construction provides a practically continuous fluid impeding surface when the blades are positioned across the entrance of pump 14 and yet permits complete withdrawal of the blades by rotation into the space within chamber 22 without interference with each other.

In the normal operation of this device, when the drive device is at rest, coil springs 50 will position gate members 48 within the fluid circuit in fluid flow impeding position. This impeding position is drectly across the entrance of pump 14. Rotation of pump member 14 will cause fluid to be circulated to and through the turbine 28. However, due to the presence of gate members 48 across the pump entrance, the fluid flow pattern will be broken up if not completely stopped, thereby preventing such fluid circulation through the turbine as is necessary to drive the turbine when connected to any appreciable load. At higher pump speeds, centrifugal force acting upon gate members 48 will cause said gates to be moved against the action of coil springs 50 into the chamber defined by the inner shroud members and out of the fluid circuit. As a result, the circulation of fluid from the pump to the turbine and back again to the pump member will be uninterrupted and the turbine will progress gradually from zero speed to a speed substantially equal to that of the pump member; that is, once the gate members are withdrawn from the fluid circuit, the coupling will function in a manner well known in the art.

From the foregoing it will be seen that the present invention provides a hydrodynamic drive device for accelerating a vehicle from a standstill in a smooth and efficient manner, while at the same time permitting the vehicle driver to maintain the vehicle stationary at engine idling speeds without the necessity of applying the vehicle brakes. This eliminates the sometimes annoying and unnecessary "creep" effect present in many transmissions employed in modern day passenger vehicles and trucks. It will be understood that the invention can be modified beyond the illustrated embodiments, and, therefore, any limitations to be imposed are those set forth in the following claims:

I claim:

1. A hydrodynamic drive device having a rotatable impeller member, a turbine member driven by fluid delivered thereto from said impeller member, said impeller and turbine members having inner and outer shroud elements cooperating to provide a path for the circulation of fluid between said members, said inner shroud elements together defining a hollow chamber, and torque interrupting means pivotally connected at one end to said impeller member within said chamber, spring means yieldably biasing a portion of said torque interrupting means into a position across the path of the fluid to impede fluid flow between said members, said portion withdrawing from fluid impeding position in response to a centrifugal force acting on said portion per se upon rotation of said impeller member.

2. A hydrodynamic drive device having pump and turbine members, inner and outer shroud elements enclosing said members and defining a path for the circulation of fluid between said members, a hollow chamber also defined by said inner shroud elements, and fluid flow impeding means mounted within said chamber, said means including a plurality of crescent-shaped gates each pivotally connected at one end to the pump inner shroud element and having a portion rotatable into the fluid circuit to impede the flow therethrough, yieldable means biasing said portion into fluid impeding position, said portion being withdrawn from said impeding position into said chamber by centrfugal force acting on said portion per se by rotation of said pump inner shroud.

3. A hydrodynamic drive device as claimed in claim 2, wherein the portions of said gates together form a substantially continuous fluid impeding surface with said portions in fluid impeding position.

4. A hydrodynamic drive device having rotatable pump and turbine members, said pump and turbine members having inner and outer shroud elements enclosing said members and defining a path for the circulation of fluid therebetween, said pump and turbine members having entrance and exit portions for the fluid flow, said inner shroud elements also defining a hollow chamber, stub shafts connected to said pump inner shroud elements within said chamber and extending across said chamber, and fluid flow impeding gates rotatably mounted at one end on said stub shafts, said gates each having a portion movable to a position across the entrance portion of the pump member to impede the flow of fluid between said members, and to a position withdrawn from fluid flow impeding position wholly within said chamber, yieldable means biasing the gate portions into fluid flow impeding position, said latter gate portions being withdrawn into said chamber by the action of centrifugal force on said gate portions per se upon rotation of said pump member above a predetermined speed.

5. A hydrodynamic drive device having rotatable pump and turbine members, said pump and turbine members having inner and outer shroud elements enclosing said members and defining a path for the circulation of fluid therebetween, said pump and turbine members having entrance and exit portions for the fluid flow, said inner shroud elements also defining a hollow chamber, stub shafts connected to said pump inner shroud elements within said chamber and extending across said chamber, and fluid flow impeding gates each rotatably mounted at one end on said stub shafts, said gates having other portions movable to a position across the space between the exit portion of the turbine member and the entrance portion of the pump member to impede the flow of fluid between said members and to another position withdrawn from fluid flow impeding position wholly within said chamber, yieldable means biasing the gate portion into fluid flow impeding position, said gate portions being withdrawn into said chamber by the action of centrifugal force on said gates upon rotation of said pump member above a predetermined speed, said gates being substantially crescent-shaped forming a substantially continuous fluid flow impeding member when the gate portions are in fluid flow impeding position.

6. A hydrodynamic drive device including, an impeller member, means to drive said impeller member, a turbine member driven by fluid delivered thereto by said impeller member, said impeller and turbine members each having inner and outer shroud elements cooperating together to define a hydraulic circuit for the transmission of torque by fluid flow between said members, the inner shroud elements together forming a hollow chamber, and torque interrupting means for impeding the free circulation of fluid between said members, said interrupting means comprising stub shafts secured to said inner pump shroud elements within said chamber and extending across substantially the entire width of said chamber, gate members of substantially crescent shape pivotally mounted at one end of said gate members on said stub shafts having a swinging movement in a radial direction into and out of the fluid circuit, spring means yieldably biasing one portion of each said gate members to a fluid flow interrupting position across the path of fluid flow between said members, said gate members being withdrawn from said fluid circuit to a position wholly within the chamber by centrifugal force acting on said portion upon sufficient rotation of said impeller member, the crescent shape of said gates providing a substantially continuous annular impeding surface upon rotation of said gates into the fluid circuit.

7. A hydrodynamic drive device including, a rotatable impeller member, means to rotate said impeller member, a rotatable turbine member, said impeller and turbine members each having inner and outer shroud elements cooperating together to define a hydraulic circuit for the flow of fluid between said members, said turbine member being rotated by fluid discharged from said impeller member, the inner shroud elements together enclosing and forming a hollow chamber, and torque interrupting means for impeding the free circulation of fluid between said members, means pivotally connecting said interrupting means at one end to said impeller member in said chamber for swinging movement of a portion of said means into and out of said chamber in a direction perpendicular to the path of fluid flow, said interrupting means portion per se constituting a mass subject to the action of centrifugal force, bias means yieldably biasing said portion of said interrupting means into the fluid circuit, said portion of the interrupting means withdrawing from said circuit wholly into said chamber in response to centrifugal force acting on said portion per se upon rotation of said impeller member.

References Cited in the file of this patent

UNITED STATES PATENTS

| | | |
|---|---|---|
| 2,245,684 | Kiep | June 17, 1941 |
| 2,267,476 | Patterson | Dec. 23, 1941 |
| 2,283,842 | Yingling | May 19, 1942 |
| 2,358,473 | Patterson | Sept. 19, 1944 |

FOREIGN PATENTS

| | | |
|---|---|---|
| 1,091,161 | France | Oct. 27, 1954 |